J. T. UNDERWOOD.
EGG OPENER.
APPLICATION FILED MAY 19, 1909.

966,269.

Patented Aug. 2, 1910.

Witnesses

James T. Underwood, Inventor

By Victor J. Evans
Attorney

UNITED STATES PATENT OFFICE.

JAMES T. UNDERWOOD, OF SPRINGFIELD, MASSACHUSETTS.

EGG-OPENER.

966,269.     Specification of Letters Patent.     Patented Aug. 2, 1910.

Application filed May 19, 1909. Serial No. 496,997.

*To all whom it may concern:*

Be it known that I, JAMES T. UNDERWOOD, a citizen of the United States, residing at Springfield, in the county of Hampden and State of Massachusetts, have invented new and useful Improvements in Egg-Openers, of which the following is a specification.

This invention relates to egg openers, and an object of the invention is to provide an opener consisting broadly of a pair of pivotally mounted blades adapted to be brought into engagement with the shell of the egg so that the egg can be conveniently severed or separated into two parts to permit the convenient discharge of its contents into a cup or other vessel.

A still further object of my invention is to provide a device of this character in which means will be employed for temporarily holding one of the severed parts of the egg to the implement.

Other objects and advantages will be apparent as the nature of the invention is better set forth, and it will be understood that changes within the scope of the claim may be resorted to without departing from the spirit of the invention.

Figure 1:
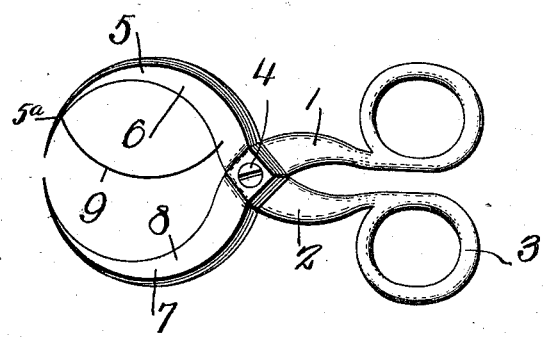
Figure 2:
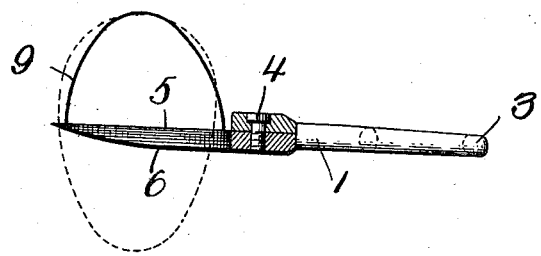

In the drawing, forming a portion of this specification and in which like numerals of reference indicate similar parts in the several views:—Figure 1 is a plan view of the opener. Fig. 2 is an edge view.

Referring now more particularly to the drawing, there is shown an egg opener comprising a pair of handles 1 and 2 which are each provided with a handhold 3. The handles 1 and 2 are pivoted to each other by means of a pivot post or screw 4. The handle 2 is provided with an arcuate cutting blade 5 which is provided upon its inner face with a beveled edge portion or cutting surface 6. The handle 1 is provided with an arcuate blade 7 which is similar in construction to the blade 5 but which is curved in an opposite direction to said blade as clearly shown in Fig. 1 so that the blades when in their operative position are adapted to entirely surround the shell portion of an egg between the point and butt portion of the egg. The blade 7 is provided with a beveled edge or cutting portion 8 similar to the portion 6 of the blade 5. A spring or retaining element is secured at one of its ends to the blade 5 adjacent to the outer extremity thereof as shown at $5^a$, and as shown the said retaining element or spring is preferably formed from a single piece of wire 9 which is bent in arcuate form, as illustrated. The inner end of the wire 9 is free for sliding movement toward or away from the blade 5 so that one of the ends of an egg can be inserted between the said wire and the blade 5.

In operation of my improved egg opener, the handles are first operated so as to move the cutting blades away from each other, after which an egg is operatively positioned with respect to the blade 5 and the retaining element 9 as shown in dotted lines in Fig. 2 of the drawing. After the egg has been positioned as above described, the handles 1 and 2 are operated so that the blades 5 and 7 will be moved toward each other and into engagement with the shell of the egg so as to sever the egg as will be appreciated. After the egg has been severed it will be seen that the retaining element 9 serves to hold or retain a portion of the egg which has been severed.

The construction is such that the just described operation will divide the egg into two parts, one part of which may be held by one hand of the operator of the device while the other part will be held to the device by means of the retainer or spring hereinbefore described.

I claim:—

As a new article of manufacture, an egg opener comprising a pair of pivoted handles, said handles being provided with oppositely curved opposing shell-severing blades, and a substantially semi-elliptical retainer secured at one of its ends to one of the blades and extended upwardly in a diagonal plane therefrom so that its major portion is disposed immediately between the blades when they are in their closed positions.

In testimony whereof I affix my signature in presence of two witnesses.

JAMES T. UNDERWOOD.

Witnesses:
   ALFRED S. CRANE,
   CAROLUS LINDSTROM.